(12) United States Patent
Ha et al.

(10) Patent No.: US 9,478,406 B2
(45) Date of Patent: Oct. 25, 2016

(54) LIGHTING DEVICE WITH FAN DIRECTED AIRFLOW AND AIR FILTERING

(71) Applicant: LG Electronics Inc., Seoul (KR)

(72) Inventors: Jeongseok Ha, Seoul (KR); Youngmin Jun, Seoul (KR); Jungsu Park, Seoul (KR)

(73) Assignee: LG Electronics Inc., Seoul (KR)

( * ) Notice: Subject to any disclaimer, the term of this patent is extended or adjusted under 35 U.S.C. 154(b) by 61 days.

(21) Appl. No.: 14/512,080

(22) Filed: Oct. 10, 2014

(65) Prior Publication Data

US 2015/0325426 A1    Nov. 12, 2015

(30) Foreign Application Priority Data

May 12, 2014 (KR) .................. 10-2014-0056703

(51) Int. Cl.
| | |
|---|---|
| *H01J 61/52* | (2006.01) |
| *H01J 65/04* | (2006.01) |
| *F21V 29/503* | (2015.01) |
| *F21V 29/508* | (2015.01) |
| *F21V 29/67* | (2015.01) |
| *B01D 45/06* | (2006.01) |

(Continued)

(52) U.S. Cl.
CPC ............ *H01J 61/523* (2013.01); *B01D 45/06* (2013.01); *F21V 29/503* (2015.01); *F21V 29/508* (2015.01); *F21V 29/67* (2015.01); *H01J 61/52* (2013.01); *H01J 65/044* (2013.01); *B01D 45/12* (2013.01); *F21V 29/505* (2015.01); *F21V 29/507* (2015.01)

(58) Field of Classification Search
CPC ...... H01J 61/523; H01J 61/52; H01J 65/044; F21V 29/503; F21V 29/508; F21V 29/673; F21V 29/677; B01D 45/06; B01D 45/12
USPC ........................................ 315/39.51
See application file for complete search history.

(56) References Cited

U.S. PATENT DOCUMENTS 5,998,934 A * 12/1999 Mimasu ................ H01J 65/044
                                                              313/35
6,668,563 B2 * 12/2003 Mirowsky .............. B64D 13/00
                                                              315/111.91

(Continued)

FOREIGN PATENT DOCUMENTS

| DE | 198 37 501 A1 | 10/1999 | |
|---|---|---|---|
| DE | 19837501 A1 * | 10/1999 | ................ F21V 9/04 |

(Continued)

*Primary Examiner* — Dylan White
(74) *Attorney, Agent, or Firm* — Birch, Stewart, Kolasch & Birch, LLP (57) ABSTRACT

A lighting device includes a casing having an inlet that introduces external air at one side and an outlet that discharges the introduced air at the other side. A fan is located within the casing to flow external air from an inlet direction to an outlet direction. An inlet cover blocks at least an upper area of the inlet to prevent external air from being directly introduced into the inlet. An air flow channel communicates the inlet and the outside, and includes two contracting flow channels having a reducing sectional area in an advancing direction of air. The two expanding flow channels communicate with the contracting flow channels and have an increasing sectional area in an advancing direction of air, so that in a connection portion of the contracting flow channel and the expanding flow channel, the advancing direction of air is changed.

14 Claims, 7 Drawing Sheets

(51) Int. Cl.
*B01D 45/12* (2006.01)
*F21V 29/505* (2015.01)
*F21V 29/507* (2015.01)

(56) References Cited

U.S. PATENT DOCUMENTS

| | | | |
|---|---|---|---|
| 7,973,261 B2 * | 7/2011 | Lee | H01J 61/52 |
| | | | 219/121.49 |
| 9,068,733 B2 * | 6/2015 | Medinis | F21K 9/00 |
| 2003/0044271 A1 | 3/2003 | Bae | |
| 2003/0141828 A1 * | 7/2003 | Choi | H01J 65/044 |
| | | | 315/248 |
| 2010/0237782 A1 * | 9/2010 | Horng | F21V 29/02 |
| | | | 315/117 |
| 2010/0295451 A1 * | 11/2010 | Hsu | F21V 29/02 |
| | | | 315/113 |
| 2012/0062095 A1 * | 3/2012 | Horng | F21V 29/02 |
| | | | 313/46 |
| 2012/0235552 A1 * | 9/2012 | Fang | F21K 9/135 |
| | | | 313/46 |

FOREIGN PATENT DOCUMENTS

| | | |
|---|---|---|
| EP | 0 947 366 A2 | 10/1999 |
| FR | 2 934 961 A3 | 2/2010 |
| JP | 2003-130312 A | 5/2003 |
| JP | 2006-156145 A | 6/2006 |
| KR | 10-2002-0031848 A | 5/2002 |
| KR | 10-0434397 B1 | 6/2004 |
| KR | 10-1297109 B1 | 8/2013 |

\* cited by examiner

LIGHTING DEVICE WITH FAN DIRECTED AIRFLOW AND AIR FILTERING

CROSS-REFERENCE TO RELATED APPLICATION

This application claims the priority benefit of Korean Patent Application No. 10-2014-0056703, filed on May 12, 2014 in the Korean Intellectual Property Office, the disclosure of which is incorporated herein by reference.

BACKGROUND OF THE INVENTION

1. Field of the Invention

The present invention relates to a lighting device.

2. Description of the Related Art

In general, an electrodeless lighting device is a device that transfers microwave energy generated in a microwave generator that generates a microwave, such as a magnetron, to a resonator through a waveguide and that excites a charging material of an electrodeless light bulb provided within the resonator and that generates light when a state of a charging gas of the electrodeless light bulb is converted to a plasma state in this process.

The lighting device is an electrodeless light bulb in which no electrode or filament exists within a light bulb. The electrodeless light bulb has a very long life-span and is semi-permanent. A charging material located within the electrodeless light bulb emits light while becoming a plasma state to emit light such as natural light.

In order for a magnetron to generate a microwave of a high frequency, a high voltage generator should supply a high voltage.

Electric components located within a casing of a lighting device generate much heat, and in order to cool the electric components, the electric components should be cooled using external air and there is a problem that the electric components are damaged by dust and insects introduced from the outside when introducing external air.

SUMMARY OF THE INVENTION

The present invention has been made in view of the above problems, and provides a lighting device that prevents external dust and insects from being introduced to the inside while cooling an internal component using external air.

In accordance with an aspect of the present invention, a lighting device includes: a casing having an inlet that introduces external air at one side and an outlet that discharges the introduced air through the inlet at the other side; a fan located within the casing to flow external air from an inlet direction to an outlet direction; an inlet cover that blocks at least an upper area of the inlet to prevent external air from being directly introduced into the inlet; and an air flow channel that communicates the inlet and the outside, wherein the air flow channel includes: two contracting flow channels having a reducing sectional area advancing in at least an advancing direction of air; and two expanding flow channels that communicate with the contracting flow channels and that have an increasing sectional area advancing in an advancing direction of air, wherein in a connection portion of the contracting flow channel and the expanding flow channel, the advancing direction of air is changed.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

An angle and direction described in a process of describing a structure of a lighting device according to an exemplary embodiment of the present invention are determined based on an angle and direction described in the drawings. In a description on a structure of a lighting device according to an exemplary embodiment of the present invention, when a reference point and a location relationship of an angle are not clearly described, the reference point and a location relationship are used with reference to a related drawing.

Hereinafter, an exemplary embodiment of the present invention will be described in detail with reference to the drawings.

Figure 1:
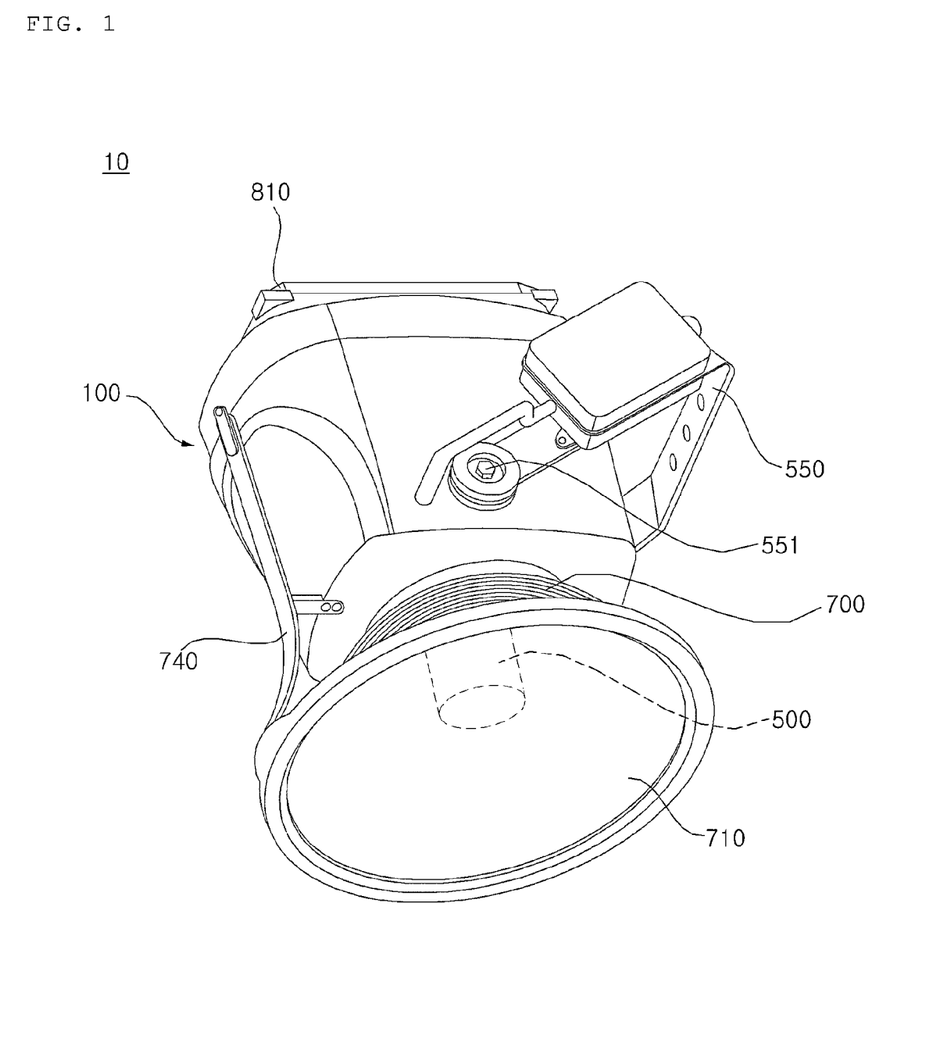
FIG. 1 is a perspective view illustrating a lighting device according to an exemplary embodiment of the present invention.
Figure 2:
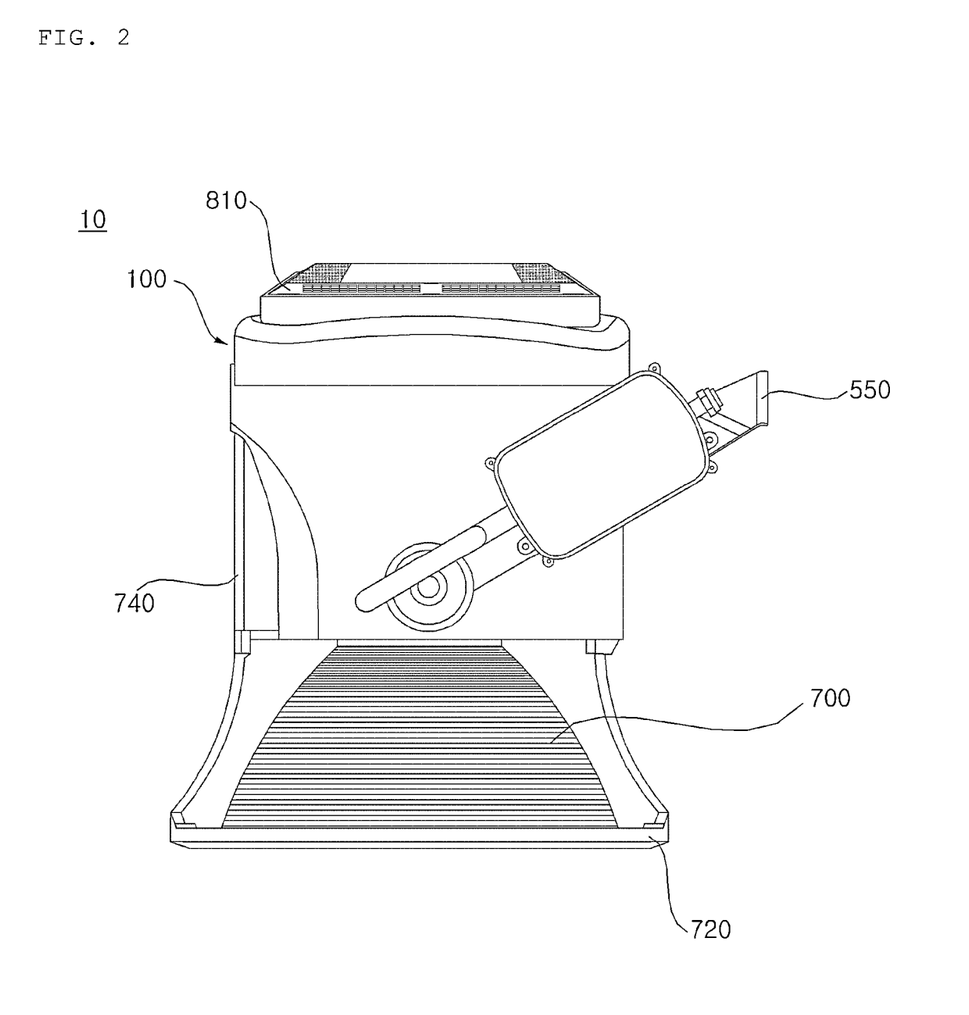
FIG. 2 is a side view of the lighting device of FIG. 1.

FIG. 1 is a perspective view of a lighting device according to an exemplary embodiment of the present invention, and FIG. 2 is a side view of the lighting device of FIG. 1.

Referring to FIGS. 1 and 2, a lighting device 10 has a main body forming an external appearance by a casing 100 having a space therein.

In the casing 100, a plurality of electric components may be housed.

The casing 100 may have an approximately hexahedral shape.

At an outer surface of the casing 100, a support 550 is provided for fixing a main body to an external structure.

Specifically, the support 550 is formed in a long quadrangular plate shape in a horizontal direction while having a predetermined thickness, and one end portion thereof is rotatably fixed to an outer surface of the casing 100 and the other end portion thereof is rotatably fixed to an outer surface of the side opposite to the casing 100 while passing through an upper portion of the casing 100.

Figure 3:
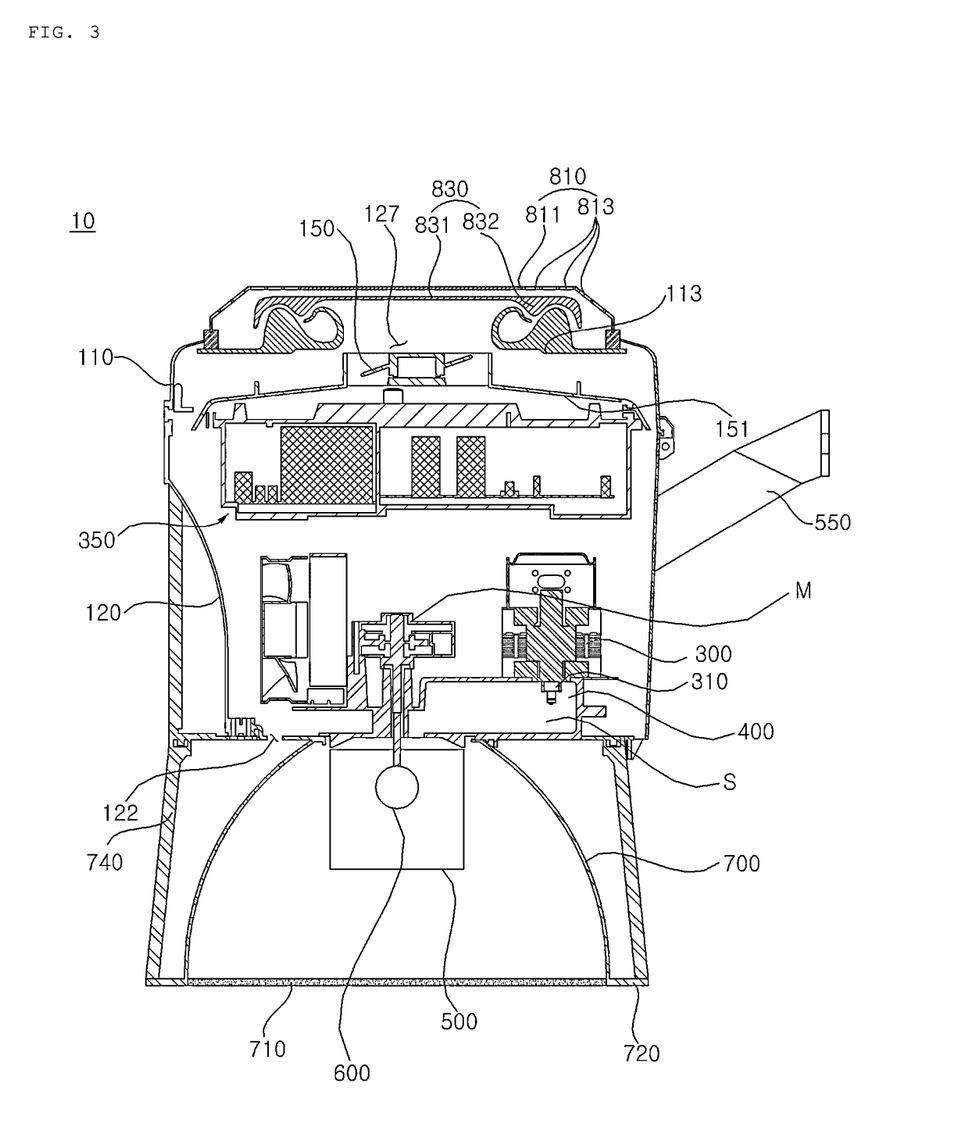
FIG. 3 is a cross-sectional view of the lighting device of FIG. 1.
Figure 4:
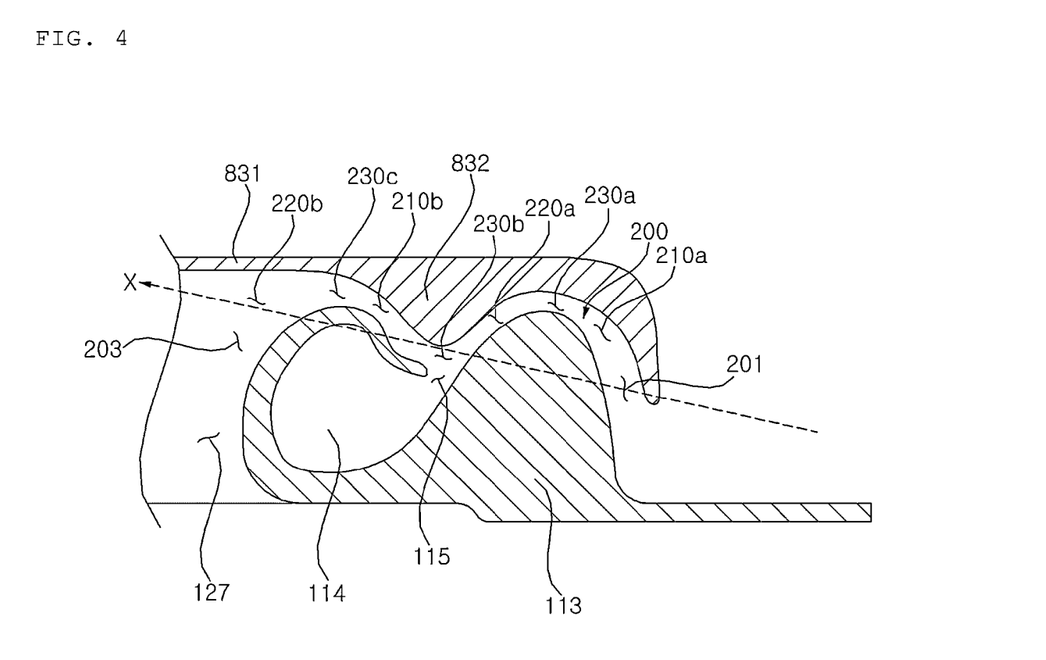
FIG. 4 is a partial cross-sectional view illustrating a periphery of an air flow channel according to an exemplary embodiment of the present invention.

FIG. 3 is a cross-sectional view of the lighting device of FIG. 1, and FIG. 4 is a partial cross-sectional view illustrating a periphery of an air flow channel according to an exemplary embodiment of the present invention.

The lighting device 10 of the present exemplary embodiment includes a casing 100 having an inlet 127 that introduces external air at one side and an outlet 122 that discharges air introduced through the inlet 127 at the other side, a high voltage generator 350 located within the casing 100 to generate a high voltage, a magnetron 300 located within the casing 100 and that receives a high voltage generated in the high voltage generator 350 to generate a microwave, a waveguide 400 coupled to the magnetron 300 to guide a microwave oscillated in the magnetron 300, a resonator 500 coupled to an outlet of the waveguide 400 to form a resonance mode and that prevents a microwave from being released to the outside, an electrodeless light bulb 600 disposed within the resonator 500 and having a light emitting material excited by a microwave to emit light, a fan 150 located within the casing 100 and that flows external air from the inlet 127 to the outlet 122, an inlet cover 830 that prevents external air from being directly inhaled to the inlet 127 by blocking an upper area of the inlet 127, and an air flow channel 200 that communicates the inlet 127 and the outside.

Here, the lighting device 10 of the present exemplary embodiment may include a device that generates light with various methods.

By using a high voltage, an electrodeless lighting device using a magnetron outputs light having high luminance and intensity and has a large heating value.

Hereinafter, an electrodeless lighting device will be described, but the lighting device is not limited thereto.

Referring to FIG. 3, the casing 100 has a hexahedral shape having the inlet 127 at one side thereof and the outlet 122 at the other side thereof and has space to locate a plurality of components therein.

Specifically, in an upper portion (see FIG. 3) of the casing 100, the inlet 127 that introduces external air may be formed, and in a lower portion thereof, the outlet 122 that discharges air introduced from the outside may be formed. However, a location of the inlet 127 and the outlet 122 are not limited thereto and may be variously changed.

The casing 100 may be formed by coupling at least two casing members together.

Specifically, by coupling an upper casing member 110 and a lower casing member 120, the casing 100 may have space therein. The upper casing member 110 has a hexahedral shape opened downward, and a downward circumferential edge thereof has a flange form extended in an external direction.

Further, in the casing 100, the inlet 127 that introduces external air is formed. Specifically, a circumferential edge of the inlet 127 is formed by a peripheral area 113 of the casing 100. That is, the inlet 127 may be empty space formed by the peripheral area 113 of the casing 100.

In an example, at an upper surface of the upper casing member 110, the inlet 127 that introduces external air may be formed.

Preferably, the peripheral area 113 of the casing 100 may have a constant width so that the inlet 127 has a constant length. When the inlet 127 has a constant length, the inlet 127 may efficiently guide air introduced from the outside.

The lower casing member 120 has a hexahedron form opened upward, and an upper circumferential edge thereof has a flange form extended in an external direction.

A circumferential edge of the upper casing member 110 and the lower casing member 120 has an approximately quadrangular form from a top view, and a circumferential edge of the upper casing member 110 and a circumferential edge of the lower casing member 120 are coupled to form the casing 100.

Specifically, the outlet 122 may be disposed at a lower portion of the lower casing member 120.

In order for air introduced into the casing 100 to receive and discharge heat of an internal component of the casing 100, the outlet 122 may be separately located from the inlet 127.

More specifically, the outlet 122 may be formed in a lower end portion of the left side of the lower casing member 120.

The high voltage generator 350 generates a high voltage to supply the high voltage to the magnetron 300.

For example, the high voltage generator 350 may include a driving circuit and a booster that boosts power.

Specifically, the driving circuit and the booster may be mounted on a printed circuit board (PCB) (not shown).

The high voltage generator 350 may further include a filter (not shown) that rectifies an applied current.

The magnetron 300 is located within the casing 100 to receive a high voltage occurring in the high voltage generator 350, thereby generating a microwave.

Specifically, the magnetron 300 is located between the inlet 127 and the outlet 122 to be cooled by external air introduced through the inlet 127.

When a driving signal is input to the high voltage generator 350, the high voltage generator 350 boosts Alternating Current (AC) power and supplies the boosted high voltage to the magnetron 300, and the magnetron 300 generates a microwave having a very high frequency while being oscillated by a high voltage.

The microwave is released to the outside of the magnetron 300 through an antenna 310 of the magnetron 300, and the released microwave is guided to the waveguide 400 while performing impedance matching by a microwave matching member (not shown) of the magnetron 300.

The waveguide 400 is coupled to the magnetron 300 to guide a microwave oscillated in the magnetron 300 to the inside of the resonator 500.

The waveguide 400 may have waveguide space S that guides a microwave therein.

The waveguide 400 may be disposed in a lower area within the casing 100.

Further, the waveguide 400 is disposed between the inlet 127 and the outlet 122 to be cooled by external air introduced into the inlet 127.

In a lower portion of one side direction of the waveguide 400, an outlet (not shown) may be formed. In the lower casing member 120, a hole (not shown) corresponding to an outlet of the waveguide 400 may be formed.

The resonator 500 is coupled to the outlet side of the waveguide 400 to prevent a microwave from being released to the outside, thereby forming a resonance mode.

A microwave flowed in the waveguide 400 is flowed to internal space of the resonator 500, thereby forming a resonance mode.

Specifically, the resonator 500 may be formed to enclose the outside of the electrodeless light bulb 600.

The resonator 500 is formed in a cylindrical shape in which an upper surface is entirely opened. The resonator 500 is formed in a kind of mesh shape to transmit light released from the electrodeless light bulb 600 and prevent a microwave introduced into internal space of the electrodeless light bulb 600 from being leaked to external space of the electrodeless light bulb 600.

The electrodeless light bulb 600 has a light emitting material disposed within the resonator 500 to be excited by a microwave and to emit light.

The electrodeless light bulb 600 and the resonator 500 may be disposed in a lower area of the outside of the casing 100.

The fan 150 is located within the casing 100 and enables external air to flow from a direction of the inlet 127 to a direction of the outlet 122.

Specifically, the fan 150 may be located adjacent to the inlet 127 of an internal area of the casing 100.

More specifically, the fan 150 may be rotatably supported to the upper casing member 110.

Further, at the inside of the casing 100, a fan fixing portion 151 that supports the fan 150 may be formed.

The fan fixing portion 151 may be coupled to the casing 100 and have space that inserts the fan 150 into a central portion.

Further, at the inside of the casing 100, a motor M that rotates the electrodeless light bulb 600 may be located.

By rotating the electrodeless light bulb 600, the motor M can improve efficiency of the lighting device.

At an outer surface of the casing 100, a reflector 700 that guides a direction of light generated in the electrodeless light bulb 600 may be disposed.

An upper portion of the reflector 700 may be formed to enclose an outer surface of the resonator 500, and the reflector 700 may be formed to have an increasing diameter toward an opening of the reflector 700.

From an entire view of the reflector 700, a diameter of a lower surface of the reflector 700 is larger than that of an upper surface thereof, and the reflector 700 is formed in a cylindrical shape having an opened lower surface.

The electrodeless light bulb 600 is formed to be inserted into internal space of the reflector 700 through the center of an upper portion of the reflector 700.

Further, as an opened lower surface of the reflector 700 is formed to have an area larger than an upper surface thereof, the reflector 700 spreads light emitted from the electrodeless light bulb 600 in a direction in which a use wants and thus the reflector 700 can illuminate a wider area.

At an inner surface of such a reflector 700, a reflection material that can better reflect light emitted from the electrodeless light bulb 600 may be applied.

For example, a reflection material may be selected from a group consisting of Acrylonitrile Butadiene Styrene (ABS), polycarbonate, acrylate, a polymer material, aluminum, aluminum alloy, and magnesium alloy.

As a lower end portion of the reflector 700 is bent to the outside, a flange 720 having a predetermined area is formed along a circumferential edge of a lower end portion of the reflector 700. At a lower surface of the flange 720, front glass 710 is located that transmits light emitted from the electrodeless light bulb 600 and that transmits the light to desired space.

As the front glass 710, in order to protect the electrodeless light bulb 600 and the reflector 700 while enduring an external impact, glass having strength while having a predetermined thickness is used, and the glass is formed to have the same area as an entire area of at least a lower surface of the reflector 700.

At a surface of the front glass 710, a conductive material is coated to shield Electromagnetic Interference (EMI) formed by a high frequency radiated from the magnetron 300. As a conductive material is coated, a high frequency radiated from the magnetron 300 is prevented from being leaked from internal space to external space of the reflector 700 and thus EMI that disturbs other electronic devices may be limited to internal space of the reflector 700.

The outlet 122 may be formed in a direction in which the reflector 700 is located.

That is, the reflector 700 may be coupled to a lower surface of the lower casing member 120, and the outlet 122 may be formed at a lower surface of the lower casing member 120.

Therefore, the reflector 700 can be cooled by the air discharged through the outlet 122.

The reflector 700 may be fixed to the lower casing member 120 by a fixing member 740.

Referring to FIGS. 3 and 4, by blocking an upper area (see FIG. 3) of the inlet 127, the inlet cover 830 prevents external air from being directly inhaled to the inlet 127.

Here, to prevent external air from being directly inhaled to the inlet 127 is to indirectly introduce external air, as external air is detoured by portions 831, 832 of the inlet cover 830 in a process of inhaling external air to the inlet 127.

By communicating the inlet 127 and the outside, an air flow channel 200 guides external air to the inlet 127.

When external air is introduced into the casing 100 through the air flow channel 200, floating matter is also inhaled and thus a means for collecting such floating matter is required.

The air flow channel 200 of the present exemplary embodiment may include two contracting flow channels 210a and 210b having a decreasing sectional area in an advancing direction of air, and two expanding flow channels 220a and 220b that communicate with the contracting flow channels 210a and 210b and that have an increasing sectional area in an advancing direction of air. The air flow channel 200 may include a plurality of expanding flow channels 220a and 220b and contracting flow channels 210a and 210b.

Here, a sectional area of the air flow channel 200 is an area at a surface vertical to an advancing direction of the air flow channel 200.

A shape of the contracting flow channels 210a and 210b is not limited, and the contracting flow channels 210a and 210b may have various shapes having a decreasing sectional area in an advancing direction of air, and a shape of the expanding flow channels 220a and 220b is not limited, and the expanding flow channels 220a and 220b may have various shapes having an increasing sectional area in an advancing direction of air.

The air flow channel 200 may be separately formed, but the air flow channel 200 of the present exemplary embodiment may be space between the peripheral area 113 of the casing 100 and the inlet cover 830.

Specifically, the air flow channel 200 separates the peripheral area 113 of the casing 100 that forms a circumferential edge of the inlet 127 to an upper portion to be blocked. In this case, the air flow channel 200 may be formed in a space between an upper portion of the peripheral area 113 of the casing 100 and a lower portion of the inlet cover 830.

More specifically, the contracting flow channels 210a and 210b may be formed to reduce a separation distance between a lower portion of the inlet cover 830 and an upper portion of the peripheral area 113 of the casing 100 in an advancing direction of air, and the expanding flow channels 220a and 220b may be formed to increase a separation distance between a lower portion of the inlet cover 830 and an upper portion of the peripheral area 113 of the casing 100 in an advancing direction of air.

Although not shown in the peripheral area 113 of the casing 100, a spacer that separately supports the inlet cover 830 from an upper portion of the peripheral area 113 of the casing 100 may be located.

From a top view of the air flow channel 200, the air flow channel 200 may be formed to enclose the inlet 127 about the inlet 127. Specifically, the inlet 127 may be formed long in a vertical direction, and the air flow channel 200 may be formed in a radial shape about the inlet 127.

A main advancing direction of air within the air flow channel 200 may intersect the inlet 127.

Therefore, because the air flow channel 200 is formed in an approximately lateral direction and the inlet 127 is formed in an approximately vertical direction, while forming an air flow channel long, both a width and a height of the lighting device can be used and thus there is an advantage that space of the lighting device is well used.

For example, the contracting flow channels 210a and 210b and the expanding flow channels 220a and 220b may be alternately located, the contracting flow channel 210a may be located at an inlet 201 of the air flow channel 200, and the expanding flow channel 220b may be located at an outlet 203 of the air flow channel 200.

Here, the inlet 201 of the air flow channel 200 is space that first introduces external air, and the outlet 203 of the air flow channel 200 communicates with the inlet 127 and is space that discharges air introduced into the air flow channel 200. Further, a main advancing direction of air is a virtual direction X that straightly connects the inlet 201 of the air flow channel 200 and the outlet 203 of the air flow channel 200.

Specifically, the contracting flow channels 210a and 210b may include a first contracting flow channel 210a and a second contracting flow channel 210b, and the expanding flow channels 220a and 220b may include a first expanding flow channel 220a and a second expanding flow channel 220b. In this case, the first contracting flow channel 210a, the first expanding flow channel 220a, the second contracting flow channel 210b, and the second expanding flow channel 220b may be disposed in the above order in a direction from the inlet 201 to the outlet 203 of the air flow channel 200.

When the contracting flow channels 210a and 210b are located at the inlet 201 of the air flow channel 200, an initial speed of introduced air may be lowered and thus a quantity of floating matter introduced through the inlet 201 of the air flow channel 200 may be reduced.

When the contracting flow channels 210a and 210b and the expanding flow channels 220a and 220b are alternately repeated, while a flow velocity of air introduced through the air flow channel 200 is changed, floating matter is collected and a pressure of air flowed to the inlet 127 may be maintained.

Preferably, because an inlet of the contracting flow channels 210a and 210b, i.e., the first contracting flow channel 210a located at the inlet 201 of the air flow channel 200 is located lower (gravity direction) than an outlet thereof, floating matter dropped by gravity can be prevented from being introduced through the inlet 201 of the air flow channel 200.

The air flow channel 200 may change an advancing direction of air in connection portions 230a, 230b, and 230c of the contracting flow channels 210a and 210b and the expanding flow channels 220a and 220b.

Here, the connection portions 230a, 230b, and 230c of the contracting flow channels 210a and 210b and the expanding flow channels 220a and 220b are a point in which an outlet of the contracting flow channel 210a and an inlet of the expanding flow channel 220b meet or a point in which an outlet of the expanding flow channels 220a and 220b and an inlet of the contracting flow channels 210a and 210b meet.

Here, a change of an advancing direction of air indicates that an advancing direction of air has an inflection point in the connection portions 230a, 230b, and 230c of the contracting flow channels 210a and 210b and the expanding flow channels 220a and 220b.

When the contracting flow channels 210a and 210b and the expanding flow channels 220a and 220b are not a straight line, an advancing direction of air is an average advancing direction of air.

When the contracting flow channels 210a and 210b and the expanding flow channels 220a and 220b are repeated, a flow velocity of air introduced into the air flow channel 200 is changed, and when an advancing direction of air is changed between the contracting flow channels 210a and 210b and the expanding flow channels 220a and 220b, floating matter within introduced air closely contacts with an inner surface of the air flow channel 200 at an inflection point by a centrifugal force and an inertial force.

In this case, in the connection portions 230a, 230b, and 230c of the contracting flow channels 210a and 210b and the expanding flow channels 220a and 220b, an internal angle formed by the expanding flow channels 220a and 220b and the contracting flow channels 210a and 210b may be 40° to 90°.

This is because when an internal angle formed by the expanding flow channels 220a and 220b and the contracting flow channels 210a and 210b is so small, a flow velocity of air within the air flow channel 200 is deteriorated, and when an internal angle formed by the expanding flow channels 220a and 220b and the contracting flow channels 210a and 210b is so large, in the connection portions 230a, 230b, and 230c of the contracting flow channels 210a and 210b and the expanding flow channels 220a and 220b, enough centrifugal force cannot be obtained.

Here, an internal angle formed by the expanding flow channels 220a and 220b and the contracting flow channels 210a and 210b is a smallest angle of angles formed by the expanding flow channels 220a and 220b and the contracting flow channels 210a and 210b.

In an example, the contracting flow channels 210a and 210b and the expanding flow channels 220a and 220b may have a slope of a direction opposite to a main advancing direction X of air. Specifically, the first contracting flow channel 210a may be obliquely disposed upward advancing from an inlet direction to an outlet direction based on a main advancing direction X of air, and the second expanding flow channel 220b may be obliquely disposed downward advancing from an inlet direction to an outlet direction.

Further, when an advancing direction of air is changed between the contracting flow channels 210a and 210b and the expanding flow channels 220a and 220b, floating matter within introduced air is slowed by a centrifugal force or an inertial force at an inflection point and thus a structure that confines such slowed floating matter is required.

Therefore, in the present exemplary embodiment, in the peripheral area 113 of the casing 100, a floating matter collection portion 114 that confines floating matter introduced into the air flow channel 200 may be further formed.

The floating matter collection portion 114 collects floating matter slowed in the connection portions 230a, 230b, and 230c of the contracting flow channels 210a and 210b and the expanding flow channels 220a and 220b.

The floating matter collection portion 114 may be empty space formed by the peripheral area 113 of the casing 100 that communicates with the air flow channel 200. The floating matter collection portion 114 may be partitioned to one space or two spaces.

The floating matter collection portion 114 may have various shapes and may have a shape that enables floating matter introduced into the inside to slow while circling at the inside.

An inlet 115 of the floating matter collection portion 114 communicates with the connection portions 230a, 230b, and 230c of the contracting flow channels 210a and 210b and the expanding flow channels 220a and 220b, and the floating matter collection portion 114 may have an area larger than the inlet 115 thereof.

From a top view of the floating matter collection portion 114, the floating matter collection portion 114 may be disposed in a radius direction of the inlet 127 to enclose the inlet 127.

Specifically, in the connection portions 230a, 230b, and 230c of the contracting flow channels 210a and 210b and the expanding flow channels 220a and 220b, the floating matter collection portion 114 may be located in an operating direction of a centrifugal force occurring while an advancing direction of air is changed.

For example, when the first expanding flow channel 220a is disposed obliquely downward in a main advancing direction X of air advancing from an inlet direction to an outlet direction and when the second contracting flow channel 210b communicated with an outlet of the first expanding flow channel 220a is disposed obliquely upward in a main advancing direction X of air advancing from an inlet direction to an outlet direction, the floating matter collection portion 114 may be located in a lower portion of the connection portion 230b of the first expanding flow channel 220a and the second contracting flow channel 210b.

In this case, it is preferable that the floating matter collection portion 114 is located in a side lower portion leaned in a main advancing direction X of air rather than a direct lower portion of the connection portion 230b of the first expanding flow channel 220a and the second contracting flow channel 210b.

A portion of air introduced from the expanding flow channels 220a and 220b to the contracting flow channels 210a and 210b is introduced into the floating matter collection portion 114. In this case, in the air introduced into the floating matter collection portion 114, floating matter is included by an inertial force and a centrifugal force. Floating matter introduced into the floating matter collection portion 114 is slowed while circling in the floating matter collection portion 114.

In the present exemplary embodiment, a mothproof cover 810 may be further included that primarily filters large floating matter to prevent introduction into the air flow channel 200.

A mothproof cover 810 is disposed to enclose the inlet cover 830, and in a partial area thereof, a vent 813 for dustproofing and mothproofing is formed.

Specifically, the mothproof cover 810 has a sectional area larger than that of the inlet cover 830 and may be disposed to enclose at least an upper area of the inlet cover 830.

The mothproof cover 810 may include a cover body 811 that forms a main body and a vent 813 formed in a partial area of the cover body 811 and for dustproofing and mothproofing.

The vent 813 prevents external insects and dust from being introduced while introducing external air.

In order to prevent external insects and dust from being introduced while introducing external air, the vent 813 may have a hole form having a predetermined size.

Specifically, the vent 813 may have a grille or mesh form. It is preferable that a grille and a mesh have a size that can prevent an insect and dust from being introduced.

Figure 5:
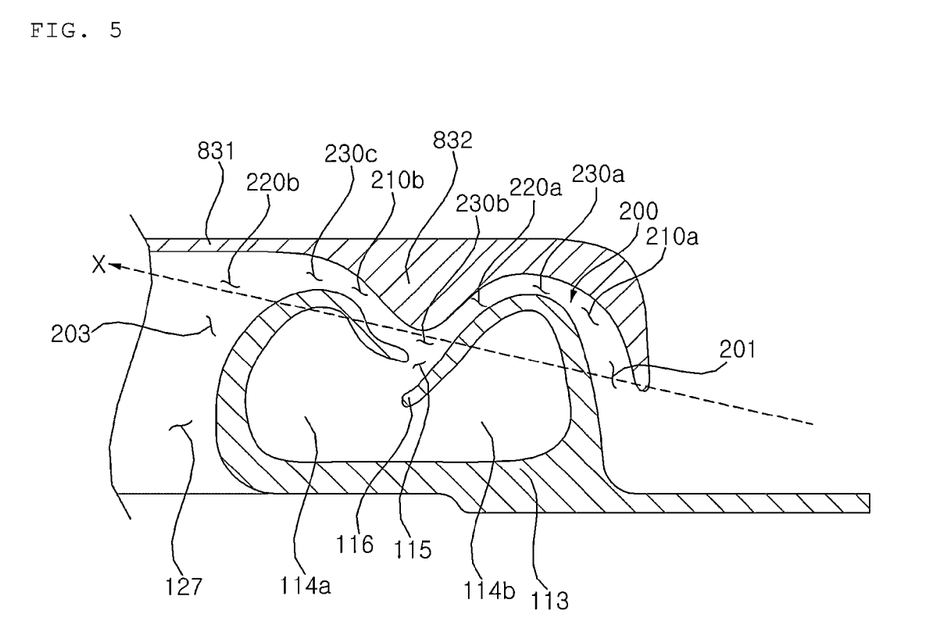
FIG. 5 is a partial cross-sectional view illustrating a periphery of an air flow channel according to another exemplary embodiment of the present invention.

FIG. 5 is a partial cross-sectional view illustrating a periphery of an air flow channel according to another exemplary embodiment of the present invention.

An exemplary embodiment described with reference to FIG. 5 is different from the foregoing exemplary embodiment described with reference to FIG. 4 in a shape of floating matter collection portions 114a and 114b.

In the present exemplary embodiment, the floating matter collection portions 114a and 114b may be partitioned into two spaces.

For example, the floating matter collection portions 114a and 114b may include a first floating matter collection portion 114a that communicates with the air flow channel 200 and a second floating matter collection portion 114b that communicates with the first floating matter collection portion 114a.

The first floating matter collection portion 114a communicates with the air flow channel 200 and an inlet 115 of the floating matter collection portion.

The first floating matter collection portion 114a may be disposed adjacent to an inlet 127 further than the second floating matter collection portion 114b. That is, the first floating matter collection portion 114a may be disposed at the inside further than the second floating matter collection portion 114b.

In an inlet 115 of the floating matter collection portion, a counterflow preventing piece 116 extended from the inlet 115 of the floating matter collection portion to the inside of the first floating matter collection portion 114a may be further included.

The counterflow preventing piece 116 prevents floating matter introduced into the first floating matter collection portion 114a from flowing again backward to the air flow channel 200.

Specifically, the counterflow preventing piece 116 is extended in an advancing direction of air at one side of the inlet 115 of the floating matter collection portion and is extended to the inside of the first floating matter collection portion 114a.

The second floating matter collection portion 114b communicates with the first floating matter collection portion 114a and may be located at the outside further than the first floating matter collection portion 114a. That is, the second floating matter collection portion 114b may be located far from the inlet 127 further than the first floating matter collection portion 114a.

While air introduced into the inlet 127 circles in the first floating matter collection portion 114a, when a flow velocity thereof reduces less, the second floating matter collection portion 114b communicates with the first floating matter collection portion 114a to reduce a flow velocity of air introduced into the floating matter dust collection portion. The second floating matter collection portion 114b provides a location that stores floating matter.

Specifically, the first floating matter collection portion 114a may be located in a side lower portion leaned in a main advancing direction X of air rather than a direct lower portion of a connection portion 230b of a first expanding flow channel 220a and a second contracting flow channel 210b, and the second floating matter collection portion 114b may be located in a side lower portion leaned in a direction opposite to a main advancing direction X of air rather than a direct lower portion of the connection portion 230b of the first expanding flow channel 220a and the second contracting flow channel 210b.

Figure 6:
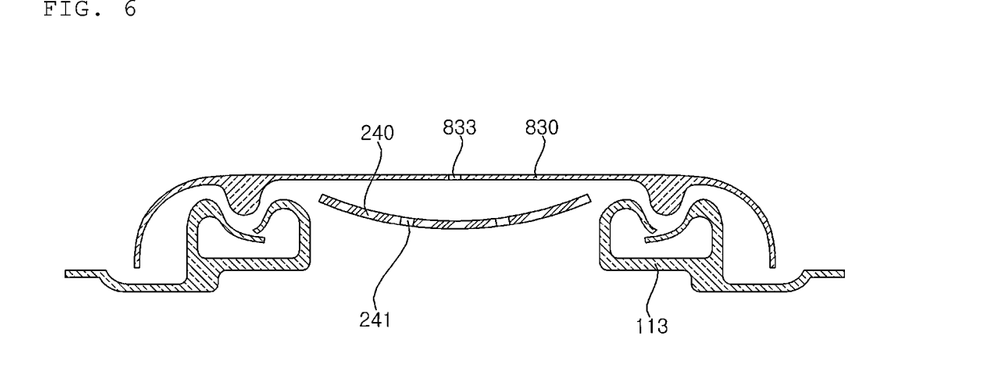
FIG. 6 is a partial cross-sectional view illustrating a periphery of an air flow channel according to another exemplary embodiment of the present invention.

FIG. 6 is a partial cross-sectional view illustrating a periphery of an air flow channel 200 according to another exemplary embodiment of the present invention.

A lighting device of the present exemplary embodiment is different from that of the foregoing exemplary embodiment described with reference to FIG. 5 by further including a floating matter collecting portion 240 and a pressure adjusting hole 833.

The floating matter collecting portion 240 is located within the inlet 127 to collect floating matter introduced through the air flow channel 200.

In an example, the floating matter collecting portion 240 may have a plate form having an area smaller than a sectional area of the inlet 127 within the inlet 127. Specifically, the floating matter collecting portion 240 may have a form in which a central portion is concave.

Further, in the floating matter collecting portion 240, a pressure relieving hole 241 that relieves a pressure may be further formed.

A portion of air discharged through the outlet 203 of the air flow channel 200 is flowed to an upper portion of the floating matter collecting portion 240, and another portion of air discharged through the outlet 203 of the air flow channel 200 is flowed to a lower portion of the floating matter collecting portion 240. In this case, because a centrifugal force of air flowed to the air flow channel 200 operates in an upper portion of the floating matter collecting portion 240, in the upper portion of the floating matter collecting portion 240, floating matter is collected.

In another example, the floating matter collecting portion 240 is located lower than the outlet 203 of the air flow channel 200 and may have a mesh structure that passes through air and that collects floating matter.

Further, the pressure adjusting hole 833 is located in one area of the inlet cover 830 vertically overlapped with the inlet 127 and is formed to communicate the inlet 127 and the outside.

When external air is introduced through the air flow channel 200, a pressure occurs in the air flow channel 200, and when the air flow channel 200 is formed at space between the peripheral area 113 of the casing 100 and the inlet cover 830, the inlet cover 830 may be damaged by a pressure occurring in the air flow channel 200. Therefore, by forming a small hole that communicates external air and the inlet 127, the inlet cover 830 may be prevented from being damaged.

The lighting device 10 operates as follows.

When a driving signal is input to the high voltage generator 350, the high voltage generator 350 boosts AC power and supplies a boosted high voltage to the magnetron 300, and while being oscillated by a high voltage, the magnetron 300 generates a microwave having a very high frequency.

The microwave is released to the outside of the magnetron 300 through an antenna of the magnetron 300, and the released microwave is guided to the waveguide 400 while performing impedance matching by a microwave matching member (not shown) of the magnetron 300.

The microwave guided to the waveguide 400 is radiated while being guided into the resonator 500 through waveguide space S of the waveguide 400, and a resonance mode is formed within the resonator 500 by the radiated microwave.

A light emitting material charged within the electrodeless light bulb 600 by a resonance mode formed within the resonator 500 is excited to emit light having intrinsic emission spectrum while being continuously formed in plasma, and the light illuminates space while being reflected downward by the reflector 700.

Figure 7:
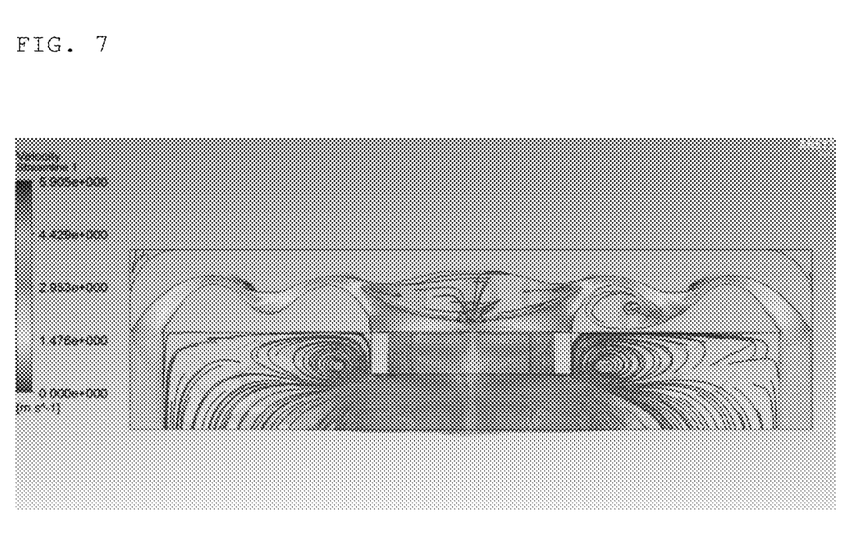
FIG. 7 is a diagram illustrating flow velocity distribution of air introduced into an air flow channel according to an exemplary embodiment of the present invention.

FIG. 7 is a diagram illustrating flow velocity distribution of air introduced into an air flow channel 200 according to an exemplary embodiment of the present invention.

Referring to FIG. 7, external air is inhaled through the vent 813 of the mothproof cover 810 by operation of the fan 150 within the casing 100.

The vent 813 of the mothproof cover 810 has a grille and mesh form to primarily intercept an insect and dust.

Air, having passed through the vent 813 is introduced into the inlet 127 through the air flow channel 200 formed between the peripheral area 113 of the casing 100 and the inlet cover 830.

While air introduced through the air flow channel 200 passes through the contracting flow channels 210a and 210b and the expanding flow channels 220a and 220b in which a direction is changed, a foreign substance, having passed through the mothproof cover 810 is removed.

External air inhaled through the inlet 127 exchanges heat with a motor M, the magnetron 300, and the waveguide 400.

Air, having exchanged heat with an internal component of the casing 100, is discharged through the outlet 122 formed in a lower portion of the casing 100.

Air, having discharged through the outlet 122 exchanges heat with the reflector 700 and cools the reflector 700.

Therefore, the reflector 700 is exposed to the outside to perform natural heat exchange with external air and exchanges heat with air discharged through the outlet 122 within the casing 100 and thus the reflector 700 can be further effectively cooled.

As described above, according to an exemplary embodiment of the present invention, an air flow channel is formed in an approximately lateral direction and an inlet is formed in an approximately vertical direction, and thus by using both a width and a height of a lighting device while forming an air flow channel long, space of the lighting device can be well used.

Further, a contracting flow channel and an expanding flow channel are alternately repeated and a direction thereof is changed and thus by changing a flow velocity of air introduced through the air flow channel, while floating matter is collected, a pressure of air flowed to an inlet can be maintained.

Further, as the lighting device further includes a floating matter collection portion, floating matter introduced through the air flow channel can be collected within the air flow channel.

Further, external air is inhaled through a vent of a mothproof cover by operation of a fan within a casing, and as the vent of the mothproof cover has a grille and mesh form, external air is passed through, but an insect and dust are primarily intercepted.

Although exemplary embodiments of the present invention have been described in detail hereinabove, it should be clearly understood that many variations and modifications of the basic inventive concepts herein described, which may appear to those skilled in the art, will still fall within the spirit and scope of the exemplary embodiments of the present invention as defined in the appended claims.

What is claimed is:
1. A lighting device, comprising:
a casing having an inlet at one side for introduction of external air and an outlet at another side for discharge of the external air introduced through the inlet;
a fan located within the casing to flow external air from the inlet to the outlet;
an inlet cover that partially blocks an area of the inlet; and
an air flow channel that communicates the inlet and the outside,
wherein the air flow channel comprises:

first and second contracting flow channels having a reducing sectional area advancing in an advancing direction of air; and first and second expanding flow channels that communicate with the contracting flow channels and that have an increasing sectional area advancing in an advancing direction of air, wherein in a connection portion between the first contracting flow channel and the first expanding flow channel, the advancing direction of air is changed, wherein the inlet cover blocks a peripheral area of the casing that forms the inlet and a periphery of the inlet, and the air flow channel is a space between the peripheral area of the casing and the inlet cover, wherein the contracting flow channels and the expanding flow channels are alternately arranged, wherein the first contracting flow channel is located at an inlet of the air flow channel, and the second expanding flow channel is located at an outlet of the air flow channel, further comprising a floating matter collecting portion located within the inlet to collect floating matter introduced through the air flow channel, and wherein the floating matter collecting portion is located lower than an outlet of the air flow channel and has a mesh structure that passes through air and that collects floating matter.

2. The lighting device of claim 1, wherein the air flow channel surrounds the inlet.

3. The lighting device of claim 1, wherein a main advancing direction of air of the air flow channel intersects the inlet.

4. The lighting device of claim 3, wherein a floating matter collection portion is located at the peripheral area of the casing that confines floating matter introduced into the air flow channel.

5. The lighting device of claim 4, wherein a floating matter collection portion is disposed adjacent to an outlet of the first expanding flow channel to introduce a portion of air introduced from the first expanding flow channel to the second contracting flow channel.

6. The lighting device of claim 4, wherein the floating matter collection portion is located to enclose the inlet and is empty space formed by the peripheral area of the casing.

7. The lighting device of claim 6, wherein the floating matter collection portion communicates with a connection portion between the second contracting flow channel and the first expanding flow channel and is located in an operation direction between a centrifugal force occurring while an advancing direction of air is changed in the connection portion between the second contracting flow channel and the first expanding flow channel.

8. The lighting device of claim 7, wherein the floating matter collection portion comprises:
    a first floating matter collection portion that communicates with the connection portion of the second contracting flow channel and the first expanding flow channel; and
    a second floating matter collection portion that communicates with the first floating matter collection portion and located outwardly of the first floating matter collection portion.

9. The lighting device of claim 1, wherein the contracting flow channels and the expanding flow channels each have a slope of an opposite direction to the main advancing direction of air.

10. The lighting device of claim 1, wherein an inlet of the first contracting flow channel located at the inlet of the air flow channel is located lower than an outlet thereof.

11. The lighting device of claim 1, wherein a pressure relieving hole that relieves a pressure is located in the floating matter collecting portion.

12. The lighting device of claim 1, wherein the inlet cover comprises a pressure adjusting hole located in an area overlapped vertically to the inlet to communicate the outside and the inlet.

13. The lighting device of claim 1, further comprising:
    a magnetron located within the casing; and
    an electrodeless light bulb that generates light using a microwave generated in the magnetron.

14. The lighting device of claim 1, further comprising a mothproof cover disposed to enclose at least the inlet cover.

* * * * *